(12) United States Patent
Tsukitani et al.

(10) Patent No.: US 7,164,829 B2
(45) Date of Patent: Jan. 16, 2007

(54) OPTICAL FIBER, OPTICAL TRANSMISSION LINE AND OPTICAL COMMUNICATIONS SYSTEM

(75) Inventors: Masao Tsukitani, Yokohama (JP); Masahiko Matsui, Yokohama (JP); Takatoshi Kato, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 611 days.

(21) Appl. No.: 10/232,825

(22) Filed: Sep. 3, 2002

(65) Prior Publication Data

US 2003/0147610 A1    Aug. 7, 2003

(30) Foreign Application Priority Data

Sep. 7, 2001  (JP)  ............... 2001-272418

(51) Int. Cl.
*G02B 6/02*   (2006.01)
(52) U.S. Cl. .................................... 385/123
(58) Field of Classification Search .............. None
See application file for complete search history.

(56) References Cited

U.S. PATENT DOCUMENTS

| | | | |
|---|---|---|---|
| 5,327,516 A | | 7/1994 | Chraplyvy et al. |
| 5,329,607 A | * | 7/1994 | Kamikawa et al. ......... 385/123 |
| 5,835,655 A | | 11/1998 | Liu et al. |
| 6,266,467 B1 | | 7/2001 | Kato et al. |
| 6,343,175 B1 | * | 1/2002 | Sasaoka ....................... 385/123 |
| 6,490,396 B1 | * | 12/2002 | Smith ........................... 385/123 |
| 6,643,438 B1 | * | 11/2003 | Sillard et al. ............... 385/123 |

OTHER PUBLICATIONS

K. Aikawa et al. "New dispersion-flattened hybrid optical fiber link composed of medium-dispersion large-effective-area fiber and negative dispersion fiber" Optical Fiber Communication Conference and Exhibit, 2001. OFC 2001 vol. 2, pp. TuH6-1-TuH6-3.*

K. Mukasa et al. "Wide-band dispersion management transmission line with medial dispersion fiber (MDF)" 26th European Conference on Optical Communication, ECOC 2000, pp. 95-96, Sep. 2000.*

"Wide-Band Dispersion Management Transmission Line With Medial Dispersion Fiber (MDF)", Kazunori Mukasa, ECOC, 2000, pp. 95-96.

"New dispersion-flattened hybrid optical fiber link composed of medium-dispersion large-effective-area fiber and negative dispersion fiber", Kazuhiko Aikawa, OFC 2001, TuH6-1 - TuH6-3, (month not available).

* cited by examiner

*Primary Examiner*—Sarah Song
(74) *Attorney, Agent, or Firm*—McDermott Will & Emery LLP (57) ABSTRACT

An optical fiber is formed for use in optical communications systems capable of transmitting and receiving a large volume of information. The optical fiber has a chromatic dispersion of at least 4 ps/nm/km and at most 15 ps/nm/km at a wavelength of 1,550 nm, a transmission loss of at most 0.190 dB/km at a wavelength of 1,530 to 1,570 nm, and an effective cutoff wavelength measured by the 2-meter method of 1610 nm or more. An optical transmission line and an optical communications system are structured by using the foregoing optical fiber.

2 Claims, 13 Drawing Sheets

OPTICAL FIBER, OPTICAL TRANSMISSION LINE AND OPTICAL COMMUNICATIONS SYSTEM

BACKGROUND OF THE INVENTION

1. Field of the Invention

The present invention relates to an optical fiber suitable for transmitting signal-carrying light waves in a 1.55-μm-wavelength band, an optical transmission line incorporating the optical fiber, and an optical communications system incorporating the optical fiber.

2. Description of the Background Art

An optical communications system can transmit and receive a large volume of information by transmitting signal-carrying light waves over an optical fiber. Furthermore, the volume of information can be increased by using an optical communications system employing a wavelength division multiplexing (WDM) transmission system, which transmits a plurality of optical signals having different wavelengths by multiplexing them. However, ever-increasing communication demands in recent years have been requiring a further increase in the volume of information to be transmitted. In order to meet this requirement, researchers and engineers have been conducting studies to decrease the separation between the neighboring wavelengths in WDM signal-carrying light waves, to broaden the wavelength band of the light waves, and to increase the bit rate of each optical signal.

When the volume of information is increased, it becomes more important to control the chromatic dispersion of optical transmission lines. For example, it is desirable that the absolute value of the cumulative dispersion of an optical transmission line be small in the wavelength band of the signal-carrying light waves, because the wave form of the signal-carrying light waves propagating the optical transmission line degrades due to the interaction between the cumulative dispersion of the optical transmission line and the self phase modulation, a type of nonlinear optical phenomena. On the other hand, a small absolute value of the chromatic dispersion increases noises due to four-wave mixing, another type of nonlinear optical phenomena. Therefore, it is desirable to avoid an excessively small absolute value in the chromatic dispersion of an optical transmission line at the wavelength band of the signal-carrying light waves. Consequently, studies taking the chromatic dispersion into account have been conducted on optical transmission lines capable of transmitting signal-carrying light waves with high quality, and some of the study results have been reported.

A typical single-mode optical fiber has a core made of silica glass doped with germanium oxide ($GeO_2$). The optical fiber has a chromatic dispersion of about 17 ps/nm/km at a wavelength of 1,550 nm, whereas some optical fibers having a smaller chromatic dispersion at the same wavelength have been reported.

For example, U.S. Pat. No. 5,835,655 has disclosed an optical fiber having a zero dispersion wavelength of 1,531 nm and a small chromatic dispersion at a wavelength of 1,550 nm. Another example is given in U.S. Pat. No. 5,327,516, which has disclosed an optical fiber having a chromatic dispersion of about 2 ps/nm/km at a wavelength of 1,550 nm. K Mukasa et al. have disclosed an optical fiber having a chromatic dispersion of 14.7 ps/nm/km at a wavelength of 1,550 nm in a paper entitled "Wide-Band Dispersion Management Transmission Line with Medial Dispersion Fiber (MDF)" (ECOC'2000, pp. 95–96). K Aikawa et al. have disclosed an optical fiber having a chromatic dispersion of 9.2 ps/nm/km at a wavelength of 1,550 nm in a paper entitled "New Dispersion-Flattened Hybrid Optical Fiber Link Composed of Medium-Dispersion Large-Effective-Area Fiber and Negative Dispersion Fiber" (OFC'2001, TuH6).

SUMMARY OF THE INVENTION

An object of the present invention is to offer an optical fiber for use in optical communications systems capable of transmitting and receiving a large volume of information. Another object is to offer an optical transmission line and an optical communications system both incorporating the optical fiber.

According to the present invention, the foregoing objects are attained by offering an optical fiber having a chromatic dispersion of at least 4 ps/nm/km and at most 15 ps/nm/km at a wavelength of 1,550 nm and a transmission loss of at most 0.190 dB/km at a wavelength of 1,530 to 1,570 nm.

The optical fiber may have a transmission loss of at most 0.185 dB/km at a wavelength of 1,550 nm. The optical fiber may comprise the following components:

(a) an inner core including the optical central axis and having a first refractive index;

(b) an outer core encircling the inner core and having a second refractive index smaller than the first refractive index; and (c) a cladding encircling the outer core and having a third refractive index smaller than the second refractive index.

The optical fiber may be specified by the following conditions:

(a) the inner core is made of silica glass undoped with germanium oxide; and (b) the outer core and the cladding are each made of silica glass doped with a refractive-index-reducing dopant.

In accordance with another aspect of the present invention, an optical transmission line is offered that comprises the following components:

(a) a first optical fiber for which the foregoing optical fiber of the present invention is used; and (b) a dispersion-compensating optical fiber that:
(b1) is connected to the first optical fiber; and
(b2) compensates the chromatic dispersion and dispersion slope of the first optical fiber.

The optical transmission line may further comprise a second optical fiber for which the foregoing optical fiber of the present invention is used. In this case, the second optical fiber is connected to the free end of the dispersion-compensating optical fiber, and the dispersion-compensating optical fiber compensates the chromatic dispersion and dispersion slope of the first and second optical fibers.

In accordance with yet another aspect of the present invention, an optical communications system is offered that comprises the following components:

(a) a repeater;

(b) a first optical fiber connected to the repeater, the first optical fiber being the foregoing optical fiber of the present invention;

(c) a dispersion-compensating optical fiber that:
(c1) is connected to the free end of the first optical fiber; and
(c2) compensates the chromatic dispersion and dispersion slope of the first optical fiber; and (d) another repeater connected to the free end of the dispersion-compensating optical fiber.

The optical communications system may further comprise a second optical fiber for which the foregoing optical fiber of the present invention is used. In this case, the second optical fiber is inserted between the dispersion-compensating optical fiber and the other repeater, and the dispersion-compensating optical fiber compensates the chromatic dispersion and dispersion slope of the first and second optical fibers.

The present invention is further explained below by referring to the accompanying drawings. The drawings are provided solely for the purpose of illustration and are not intended to limit the scope of the invention.

DETAILED DESCRIPTION OF THE INVENTION

Embodiments of the present invention are explained below by referring to the accompanying drawings. In the drawings, the same sign or number refers to the same part to avoid duplicated explanation. The ratios of the dimensions in the drawings do not necessarily coincide with the explanation.

Figure 1:
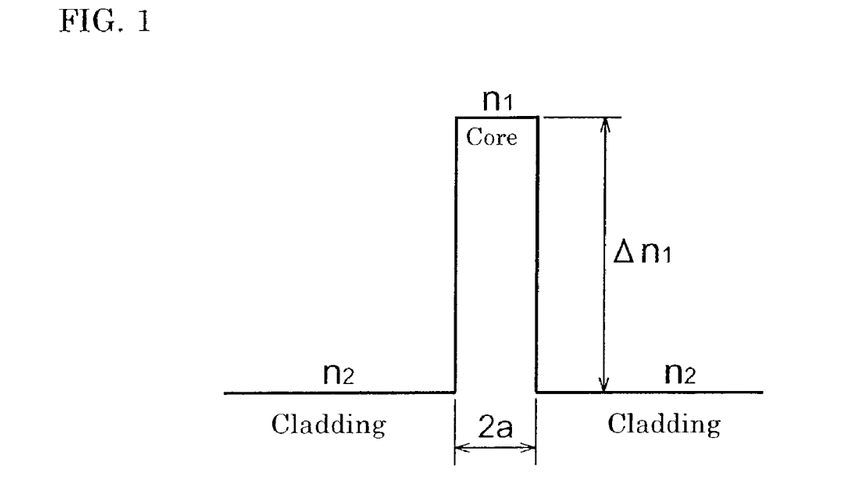
FIG. 1 is a diagram showing the refractive-index profile of the optical fiber of a first embodiment.

First, a first embodiment of an optical fiber of the present invention is explained below. FIG. 1 is a diagram showing the refractive-index profile of the optical fiber of the first embodiment. The optical fiber comprises a core including the optical central axis and a cladding encircling the core. The core has a refractive index of $n_1$ and the cladding has a refractive index of $n_2$, where $n_1 > n_2$. The optical fiber is based on silica glass. The core is made of practically pure silica glass without being doped with $GeO_2$. Incidentally, the cladding is doped with a refractive-index-reducing dopant such as fluorine. The core may be doped with a small amount of chlorine. The optical fiber has a relative refractive-index difference ($\Delta n_1$) between the core and the cladding expressed as $$\Delta n_1 = (n_1 - n_2)/n_2.$$

The optical fiber is designed to have proper values of $\Delta n_1$ and the core diameter 2a. As a result, it has a chromatic dispersion of at least 4 ps/nm/km and at most 15 ps/nm/km at a wavelength of 1,550 nm and a transmission loss of at most 0.190 dB/km at a wavelength of 1,530 to 1,570 nm. It is desirable that the transmission loss be at most 0.185 dB/km at a wavelength of 1,550 nm.

Because the optical fiber has a chromatic dispersion of at most 15 ps/nm/km at a wavelength of 1,550 nm, it can suppress the degradation of the waveform of the signal-carrying light waves due to the cumulative dispersion. Because the optical fiber has a chromatic dispersion of at least 4 ps/nm/km at a wavelength of 1,550 nm, it can suppress the degradation of the waveform of the signal-carrying light waves due to four-wave mixing. Because the optical fiber has a transmission loss of at most 0.190 dB/km at a wavelength of 1,530 to 1,570 nm, it can transmit signal-carrying light waves over long distances with low loss. Because the optical fiber has a core undoped with $GeO_2$, it can reduce the loss due to Rayleigh scattering.

Figure 5:
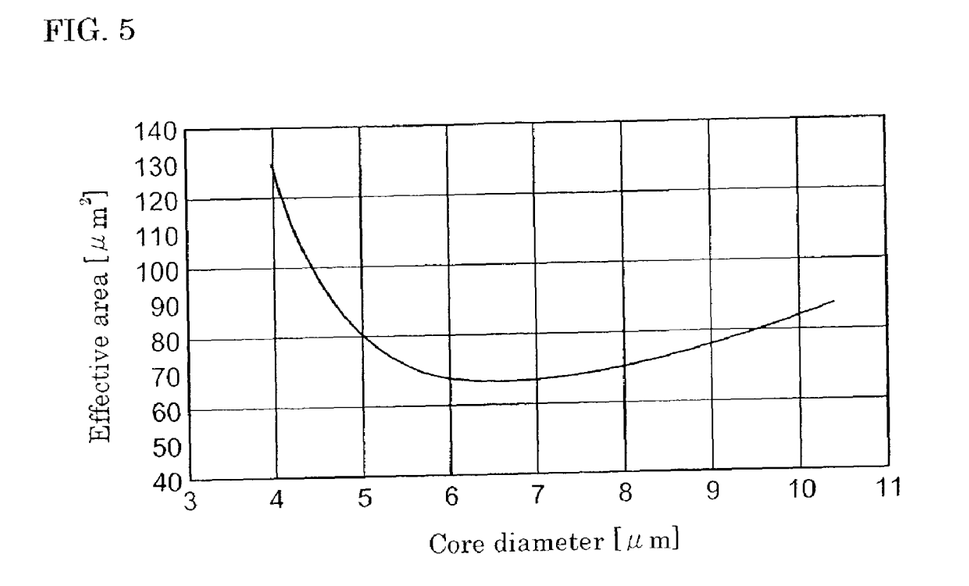
FIG. 5 is a graph showing the relationship between the core diameter 2a of the optical fiber of the first embodiment and the effective area.
Figure 6:
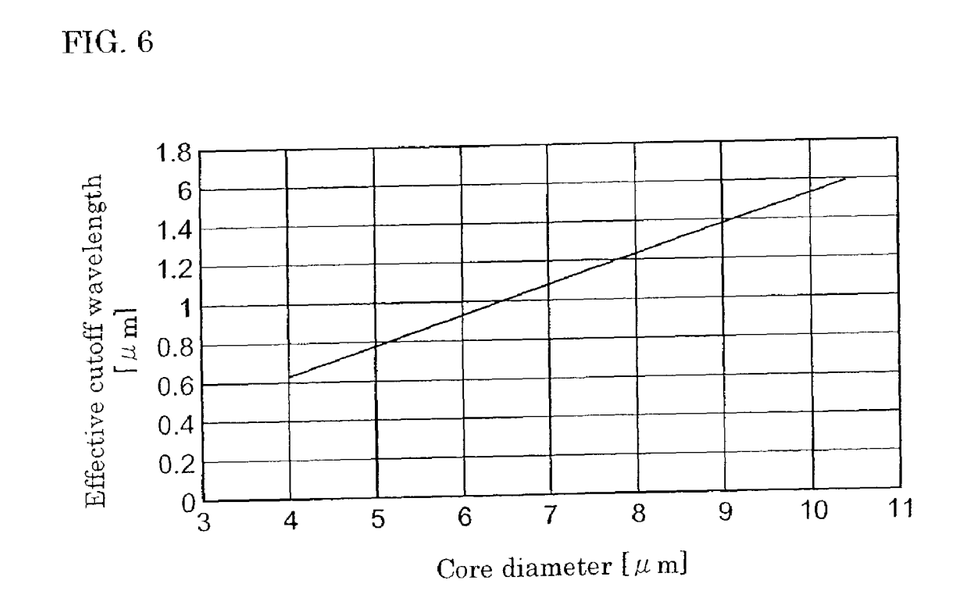
FIG. 6 is a graph showing the relationship between the core diameter 2a of the optical fiber of the first embodiment and the effective cutoff wavelength.
Figure 7:
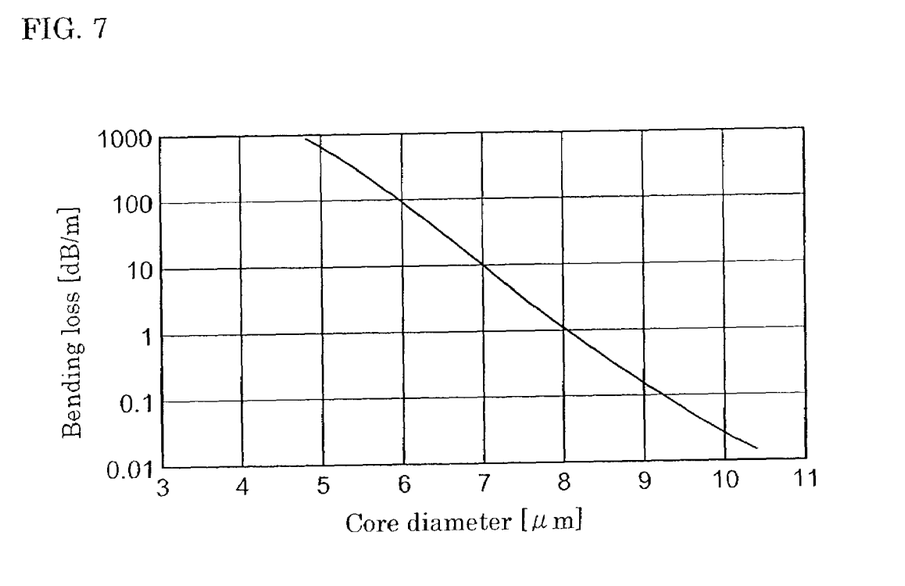
FIG. 7 is a graph showing the relationship between the core diameter 2a of the optical fiber of the first embodiment and the bending loss.

FIGS. 2 to 7 are graphs showing the calculated results on the relationship between the core diameter 2a of the optical fiber of the first embodiment having a relative refractive-index difference $\Delta n_1$ of 0.4% and various properties of the optical fiber at a wavelength of 1,550 nm. The term "bending loss" used in FIG. 7 represents the increment of the loss when the optical fiber is wound on a round bar having a diameter of 20 mm.

Figure 2:
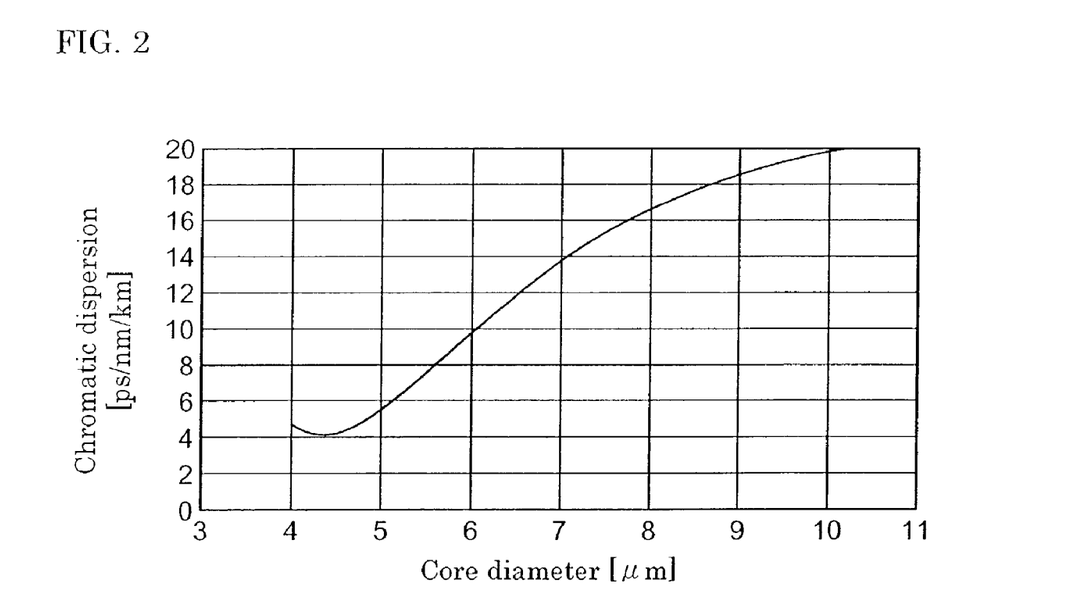
FIG. 2 is a graph showing the relationship between the core diameter 2a of the optical fiber of the first embodiment and the chromatic dispersion.
Figure 3:
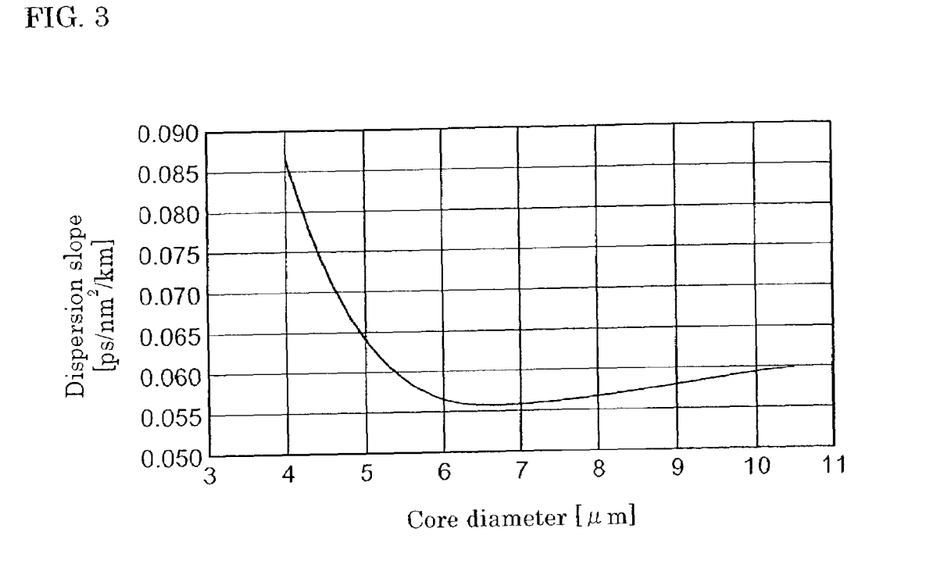
FIG. 3 is a graph showing the relationship between the core diameter 2a of the optical fiber of the first embodiment and the dispersion slope.
Figure 4:
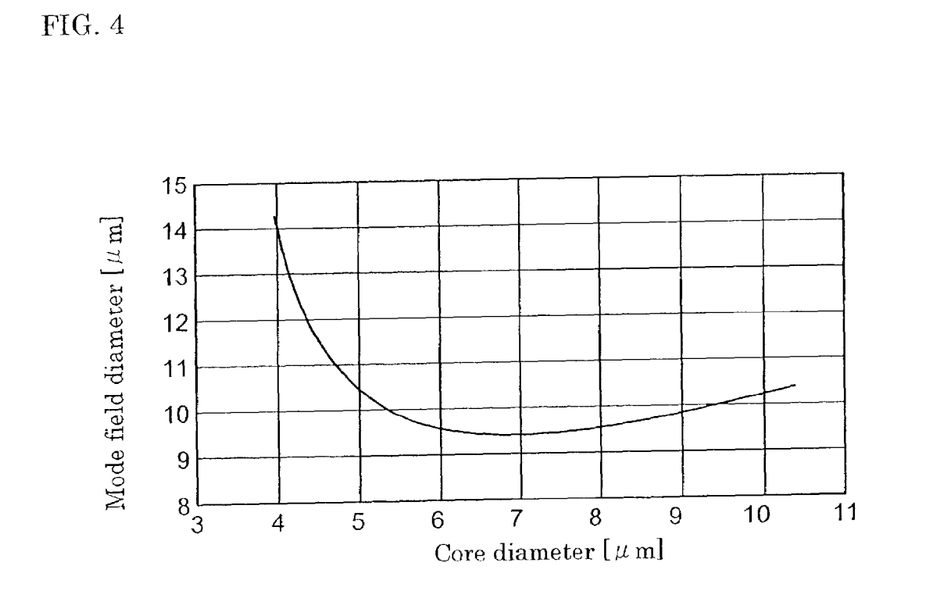
FIG. 4 is a graph showing the relationship between the core diameter 2a of the optical fiber of the first embodiment and the mode field diameter.

As shown in FIG. 2, the chromatic dispersion becomes at least 4 ps/nm/km and at most 15 ps/nm/km at a wavelength of 1,550 nm when the core diameter 2a falls in the range of 4 to 7.5 μm. As shown in FIG. 3, the dispersion slope is at most 0.085 ps/nm$^2$/km at a wavelength of 1,550 nm when the core diameter 2a falls in the range of 4 to 7.5 μm. It takes a minimum value when the core diameter 2a is about 6 μm to about 7.5 μm. As shown in FIG. 4, the mode field diameter is at least 9.5 μm at a wavelength of 1,550 nm when the core diameter 2a falls in the range of 4 to 7.5 μm. As shown in FIG. 5, the effective area is at least 67 μm$^2$ at a wavelength of 1,550 nm when the core diameter 2a falls in the range of 4 to 7.5 μm. As shown in FIG. 6, the effective cutoff wavelength increases with increasing core diameter 2a. The effective cutoff wavelength is 0.65 to 1.15 μm when the core diameter 2a falls in the range of 4 to 7.5 μm. As shown in FIG. 7, the bending loss at a bending diameter of 20 mm at a wavelength of 1,550 nm decreases with increasing core diameter 2a. The bending loss is 3 to 100 dB/m or so when the core diameter 2a falls in the range of 6 to 7.5 μm.

Figure 8:
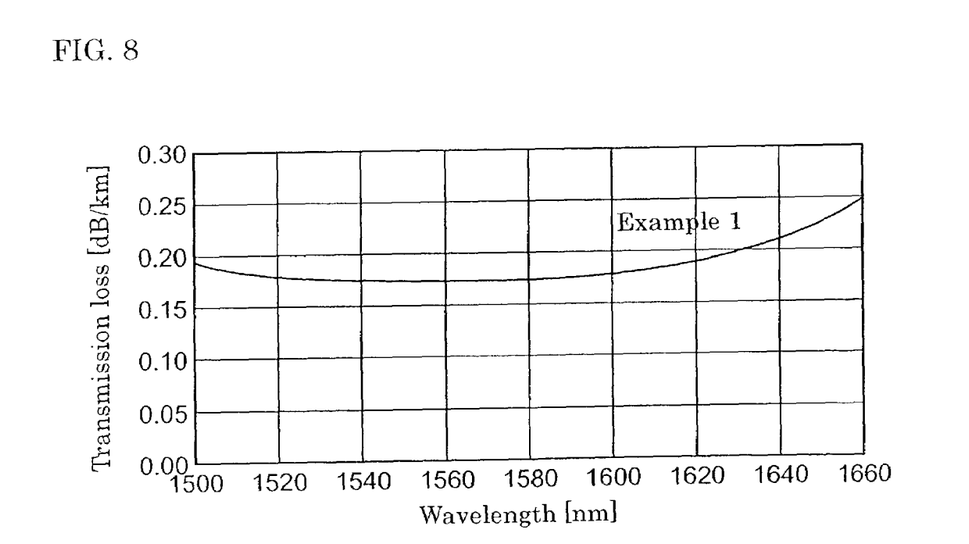
FIG. 8 is a graph showing the relationship between the transmission loss and the wavelength for the optical fiber of Example 1.
Figure 9:
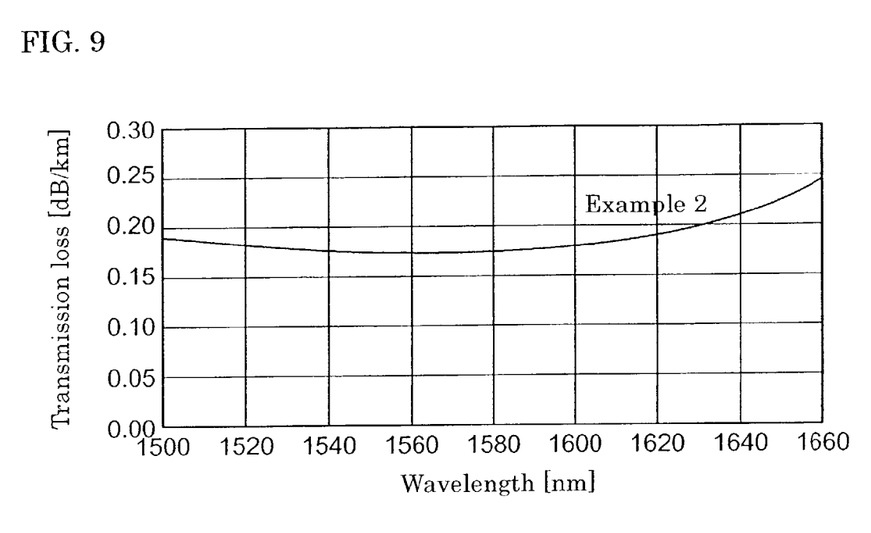
FIG. 9 is a graph showing the relationship between the transmission loss and the wavelength for the optical fiber of Example 2.
Figure 10:
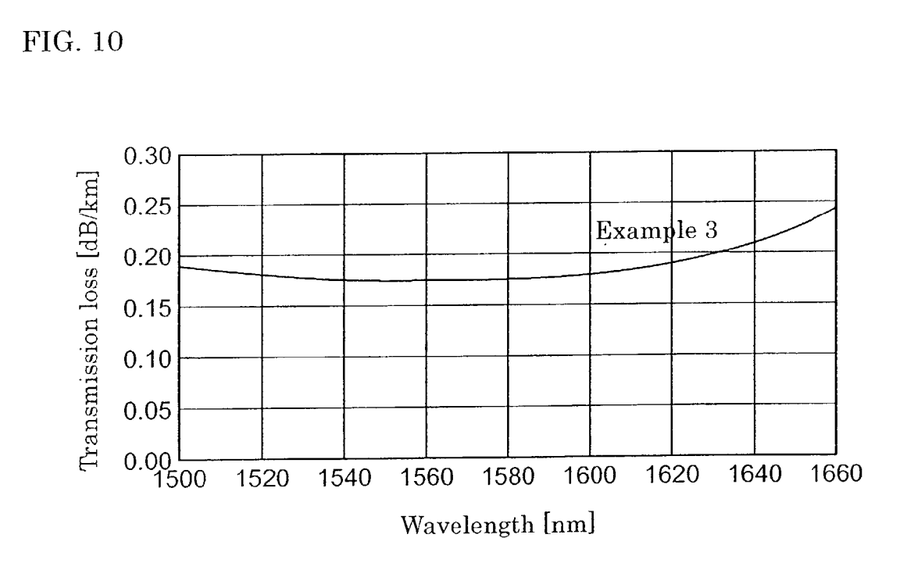
FIG. 10 is a graph showing the relationship between the transmission loss and the wavelength for the optical fiber of Example 3.

Three examples of optical fibers produced for the first embodiment are explained below. Table I shows properties of the optical fibers of Examples 1 to 3 produced as the first embodiment. The optical properties were measured at a wavelength of 1,550 nm. The cutoff wavelength was measured by the 2-meter method. FIGS. 8 to 10 are graphs showing the relationship between the transmission loss and the wavelength for the optical fibers of Examples 1 to 3, respectively. The optical fibers of Examples 1 to 3 had the refractive-index profile shown in FIG. 1. They comprised a core made of pure silica glass and a cladding doped with fluorine.

TABLE I

| Example | | 1 | 2 | 3 |
|---|---|---|---|---|
| Core diameter | μm | 7.2 | 6.8 | 6.4 |
| $\Delta n_1$ | % | 0.36 | 0.36 | 0.36 |
| Transmission loss | dB/km | 0.173 | 0.175 | 0.176 |
| Chromatic dispersion | ps/nm/km | 12.4 | 11.2 | 10.1 |
| Dispersion slope | ps/nm$^2$/km | 0.053 | 0.052 | 0.052 |
| Mode field diameter | μm | 9.4 | 9.4 | 9.4 |
| Effective area | μm$^2$ | 66.9 | 66.2 | 66.3 |
| Effective cutoff wavelength | nm | 1,084 | 1,070 | 1,050 |
| Polarization mode dispersion | ps/km$^{1/2}$ | 0.03 | 0.01 | 0.04 |

As shown in FIG. 8, the optical fiber of Example 1 had a transmission loss of 0.176 dB/km at a wavelength of 1,530 nm, 0.173 dB/km at a wavelength of 1,550 nm, and 0.174 dB/km at a wavelength of 1,570 nm. As shown in FIG. 9, the optical fiber of Example 2 had a transmission loss of 0.179 dB/km at a wavelength of 1,530 nm, 0.175 dB/km at a wavelength of 1,550 nm, and 0.175 dB/km at a wavelength of 1,570 nm. As shown in FIG. 10, the optical fiber of Example 3 had a transmission loss of 0.178 dB/km at a wavelength of 1,530 nm, 0.176 dB/km at a wavelength of 1,550 nm, and 0.175 dB/km at a wavelength of 1,570 nm.

The optical fibers of Examples 1 to 3 had a chromatic dispersion of at least 4 ps/nm/km and at most 15 ps/nm/km at a wavelength of 1,550 nm, a transmission loss of at most 0.190 dB/km at a wavelength of 1,530 to 1,570 nm, and a transmission loss of at most 0.185 dB/km at a wavelength of 1,550 nm. The optical fibers of Examples 1 to 3 had a relative refractive-index difference $\Delta n_1$ of 0.36%, which is slightly different from that (0.4%) used for obtaining the calculation results shown in FIGS. 2 to 7. Consequently, they had properties slightly different from those shown in FIGS. 2 to 7 for the same core diameter.

Figure 11:
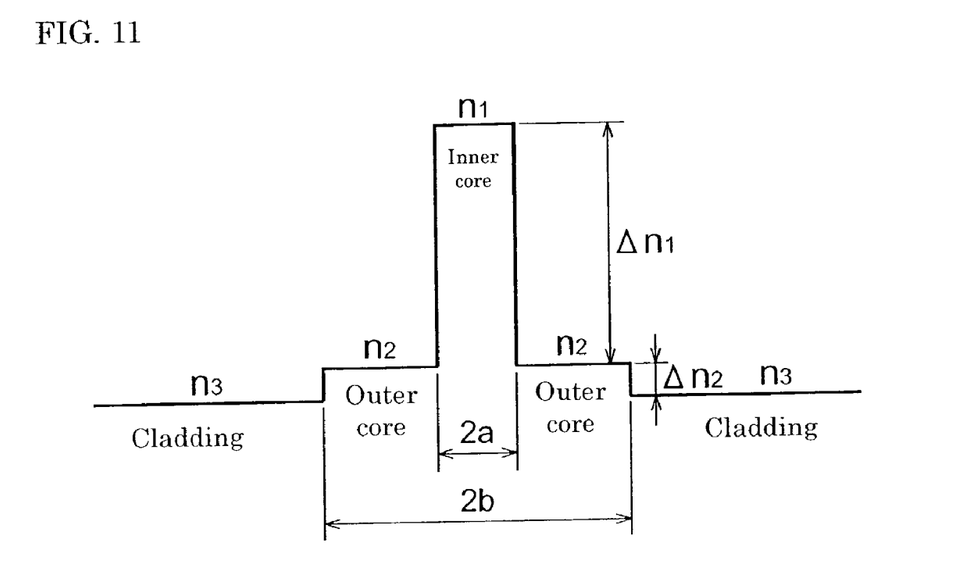
FIG. 11 is a diagram showing the refractive-index profile of the optical fiber of a second embodiment.

Next, a second embodiment of an optical fiber of the present invention is explained below. FIG. 11 is a diagram showing the refractive-index profile of the optical fiber of the second embodiment. The optical fiber comprises an inner core including the optical central axis, an outer core encircling the inner core, and a cladding encircling the outer core. The inner core has a refractive index of $n_1$, the outer core has a refractive index of $n_2$, and the cladding has a refractive index of $n_3$, where $n_1 > n_2 > n_3$. The optical fiber is based on silica glass. The inner core is made of practically pure silica glass without being doped with $GeO_2$. The outer core and the cladding are doped with a refractive-index-reducing dopant such as fluorine. The inner core may be doped with a small amount of chlorine. The optical fiber has a relative refractive-index difference between the inner core and the outer core expressed by $\Delta n_1$, and a relative refractive-index difference ($\Delta n_2$) between the outer core and the cladding expressed as $$\Delta n_2 = (n_2 - n_3)/n_3.$$

The optical fiber is designed to have proper values of $\Delta n_1$, $\Delta n_2$, the inner-core diameter 2a, and the outer-core diameter 2b. As a result, it has a chromatic dispersion of at least 4 ps/nm/km and at most 15 ps/nm/km at a wavelength of 1,550 nm and a transmission loss of at most 0.190 dB/km at a wavelength of 1,530 to 1,570 nm. It is desirable that the transmission loss be at most 0.185 dB/km at a wavelength of 1,550 nm.

As with the optical fiber of the first embodiment, the optical fiber of this embodiment can suppress the degradation of the waveform of the signal-carrying light waves due to the cumulative dispersion or four-wave mixing. It can also transmit signal-carrying light waves over long distances with low loss. Because the optical fiber has an inner core undoped with $GeO_2$, it can reduce the loss due to Rayleigh scattering.

Figure 15:
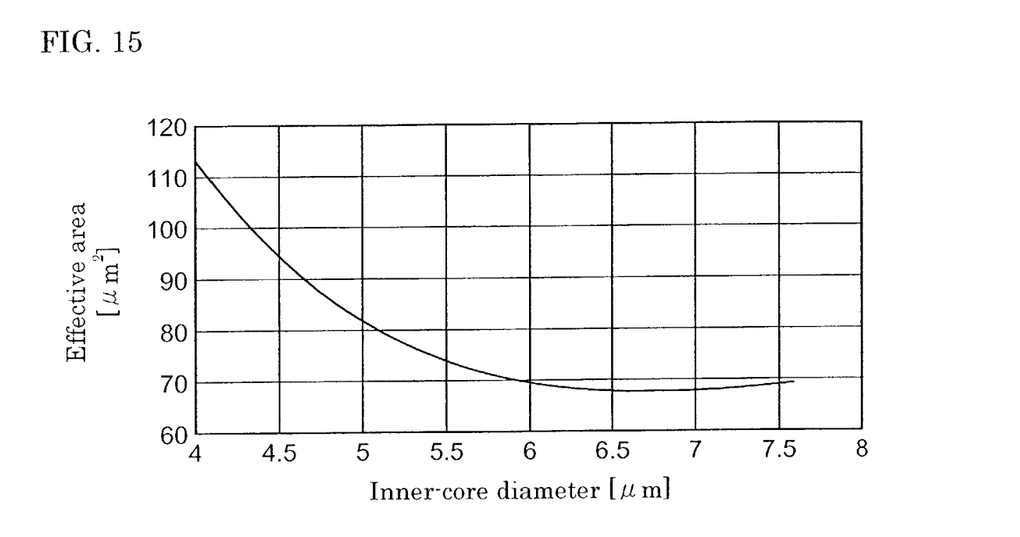
FIG. 15 is a graph showing the relationship between the core diameter 2a of the optical fiber of the second embodiment and the effective area.
Figure 16:
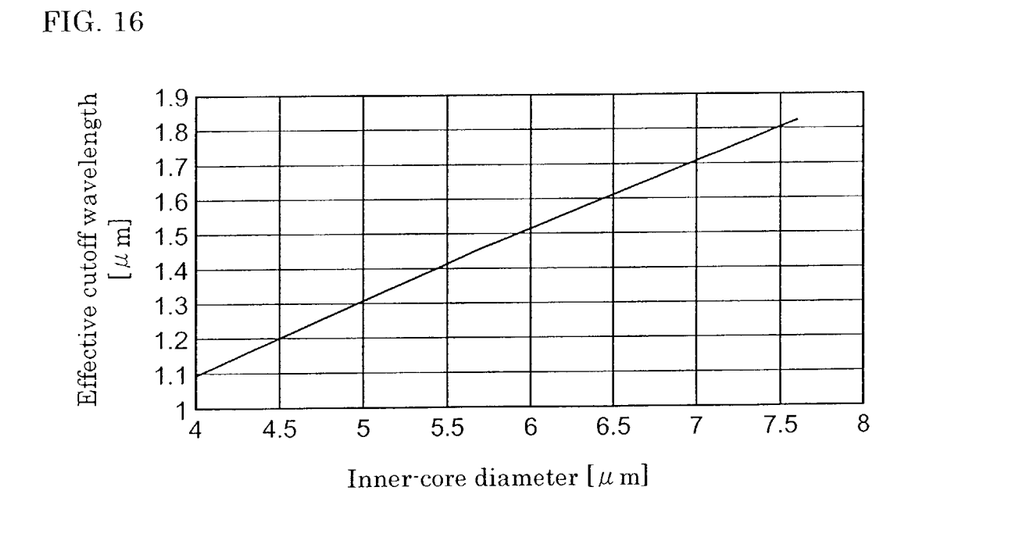
FIG. 16 is a graph showing the relationship between the core diameter 2a of the optical fiber of the second embodiment and the effective cutoff wavelength.
Figure 17:
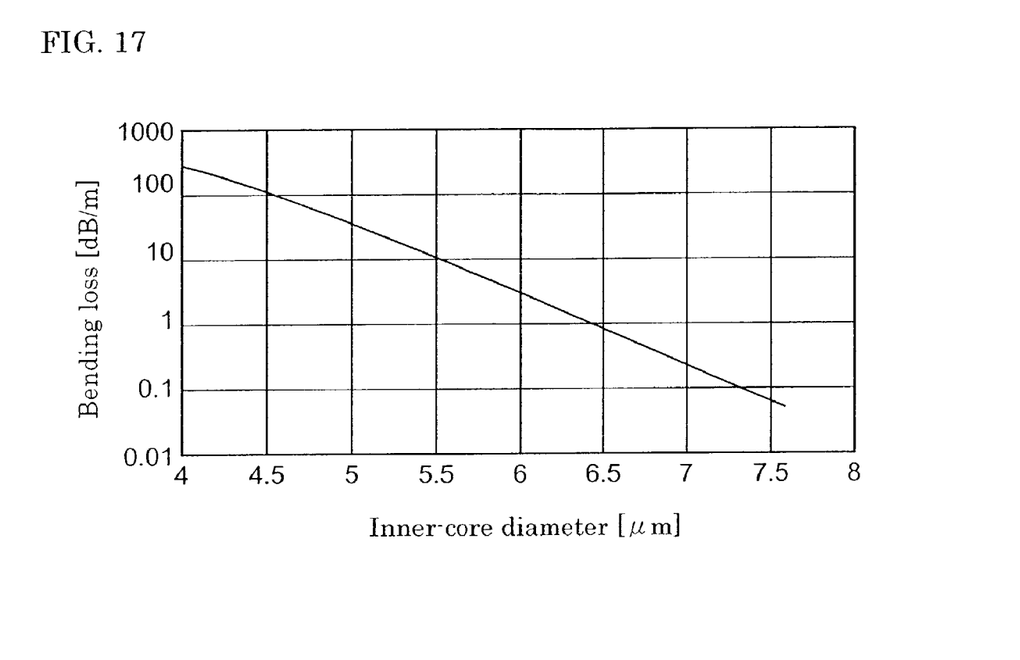
FIG. 17 is a graph showing the relationship between the core diameter 2a of the optical fiber of the second embodiment and the bending loss.

FIGS. 12 to 17 are graphs showing the calculated results on the relationship between the inner-core diameter 2a of the optical fiber of the second embodiment and various properties of the optical fiber at a wavelength of 1,550 nm. The optical fiber used for the calculation has a relative refractive-index difference $\Delta n_1$ of 0.43%, a relative refractive-index difference $\Delta n_2$ of 0.08%, and an inner-core diameter 2a to outer-core diameter 2b ratio Ra of 0.2 (Ra=a/b). The term "bending loss" used in FIG. 17 represents the increment of the loss when the optical fiber is wound on a round bar having a diameter of 20 mm.

Figure 12:
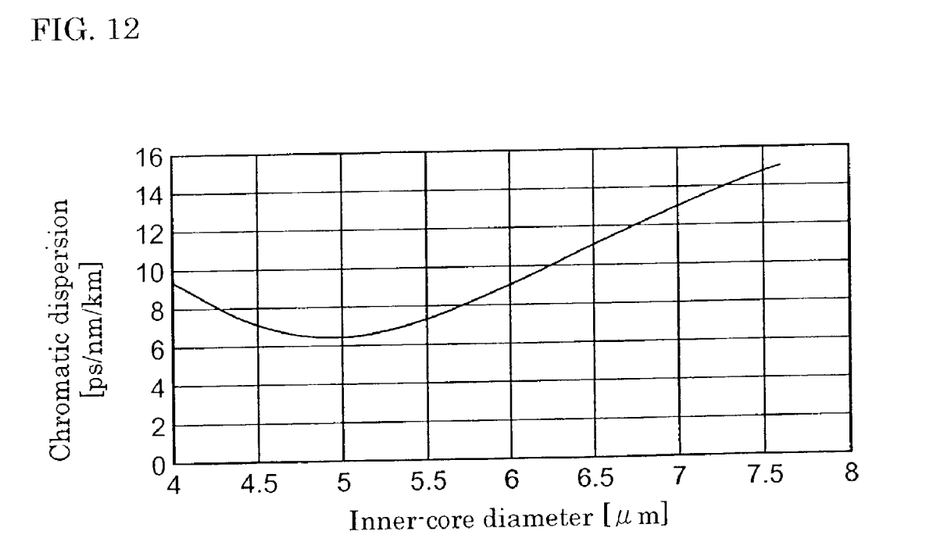
FIG. 12 is a graph showing the relationship between the core diameter 2a of the optical fiber of the second embodiment and the chromatic dispersion.
Figure 13:
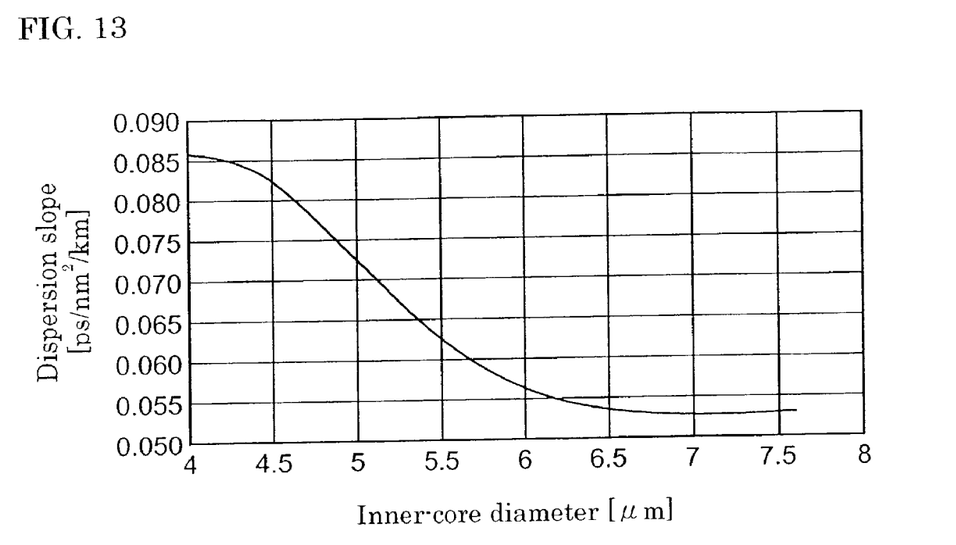
FIG. 13 is a graph showing the relationship between the core diameter 2a of the optical fiber of the second embodiment and the dispersion slope.
Figure 14:
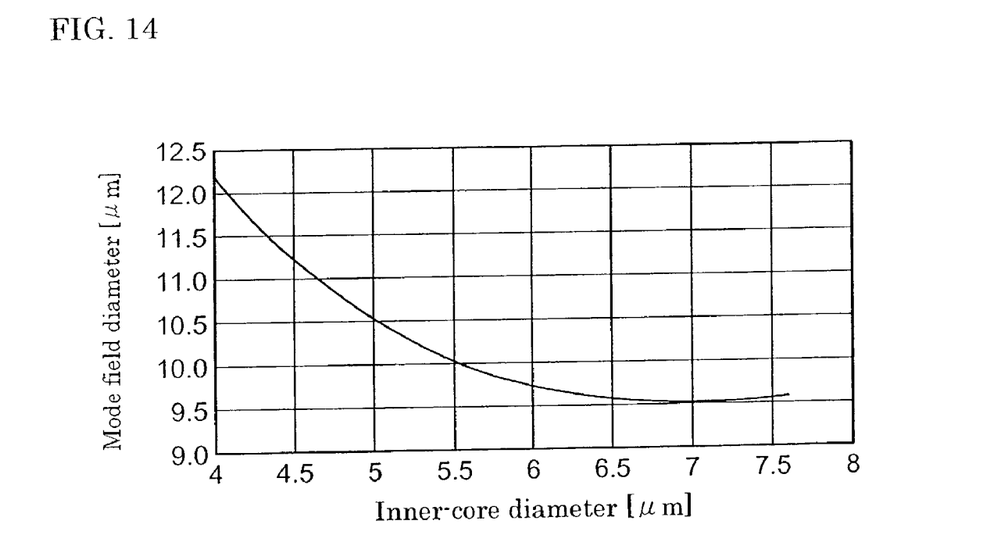
FIG. 14 is a graph showing the relationship between the core diameter 2a of the optical fiber of the second embodiment and the mode field diameter.

As shown in FIG. 12, the chromatic dispersion becomes at least 4 ps/nm/km and at most 15 ps/nm/km at a wavelength of 1,550 nm when the inner-core diameter 2a is less than 7.5 lm. As shown in FIG. 13, the dispersion slope is at most 0.085 ps/nm$^2$/km at a wavelength of 1,550 nm. As shown in FIG. 14, the mode field diameter is at least 9.5 μm at a wavelength of 1,550 nm. As shown in FIG. 15, the effective area is at least 67 µm² at a wavelength of 1,550 nm. As shown in FIG. 16, the effective cutoff wavelength increases with increasing inner-core diameter 2a. The effective cutoff wavelength is 1.1 to 1.8 µm when the inner-core diameter 2a falls in the range of 4 to 7.5 µm. As shown in FIG. 17, the bending loss at a bending diameter of 20 mm at a wavelength of 1,550 nm decreases with increasing inner-core diameter 2a. The bending loss is 0.06 to 3 dB/m or so when the inner-core diameter 2a falls in the range of 6 to 7.5 µm.

Four examples of optical fibers produced for the second embodiment are explained below. Table II shows properties of the optical fibers of Examples 4 to 7 produced as the second embodiment. The optical properties were measured at a wavelength of 1,550 nm. FIGS. 18 to 21 are graphs showing the relationship between the transmission loss and the wavelength for the optical fibers of Examples 4 to 7, respectively. The optical fibers of Examples 4 to 7 had the refractive-index profile shown in FIG. 11. They comprised an inner core made of pure silica glass and an outer core and a cladding both doped with fluorine.

TABLE II

| Example | | 4 | 5 | 6 | 7 |
|---|---|---|---|---|---|
| Inner-core diameter | µm | 7.0 | 6.6 | 6.4 | 6.1 |
| Outer-core diameter | µm | 33.4 | 32.5 | 31.0 | 30.7 |
| $\Delta n_1$ | % | 0.40 | 0.40 | 0.40 | 0.40 |
| $\Delta n_2$ | % | 0.08 | 0.08 | 0.08 | 0.08 |
| Transmission loss | dB/km | 0.180 | 0.180 | 0.180 | 0.184 |
| Chromatic dispersion | ps/nm/km | 11.1 | 10.6 | 10.1 | 9.1 |
| Dispersion slope | ps/nm²/km | 0.053 | 0.054 | 0.054 | 0.055 |
| Mode field diameter | µm | 9.4 | 9.4 | 9.5 | 9.6 |
| Effective area | µm² | 66.1 | 66.3 | 66.6 | 67.7 |
| Effective cutoff wavelength (2-m-long fiber) | nm | 1,778 | 1,744 | 1,678 | 1,610 |
| Effective cutoff wavelength (after cabling) | nm | 1,287 | 1,377 | 1,302 | 1,291 |
| Polarization mode dispersion | ps/km$^{1/2}$ | 0.04 | 0.05 | 0.05 | 0.02 |
| Bending loss | dB/m | 0.9 | 1.4 | 4.5 | 12.1 |

Figure 18:
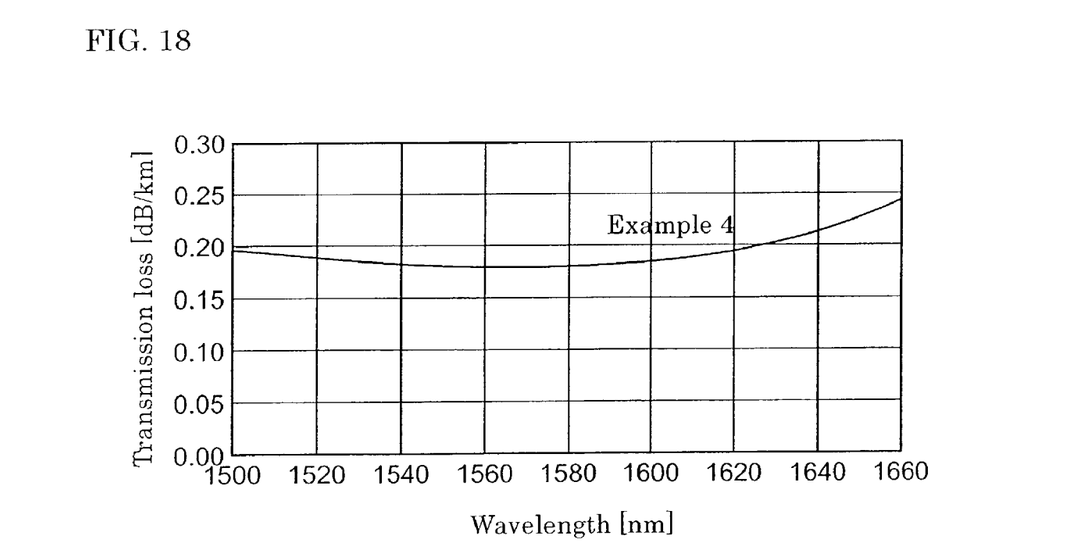
FIG. 18 is a graph showing the relationship between the transmission loss and the wavelength for the optical fiber of Example 4.
Figure 19:
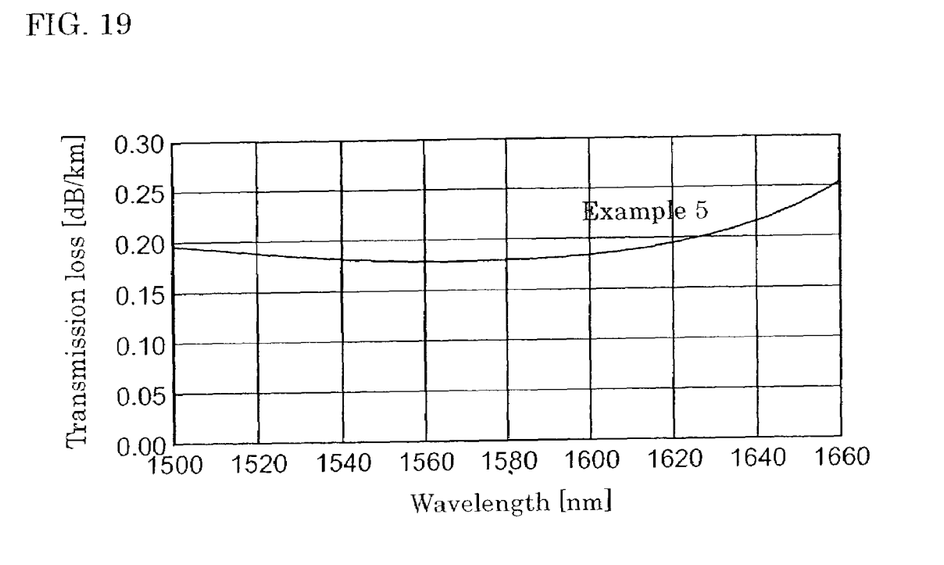
FIG. 19 is a graph showing the relationship between the transmission loss and the wavelength for the optical fiber of Example 5.
Figure 20:
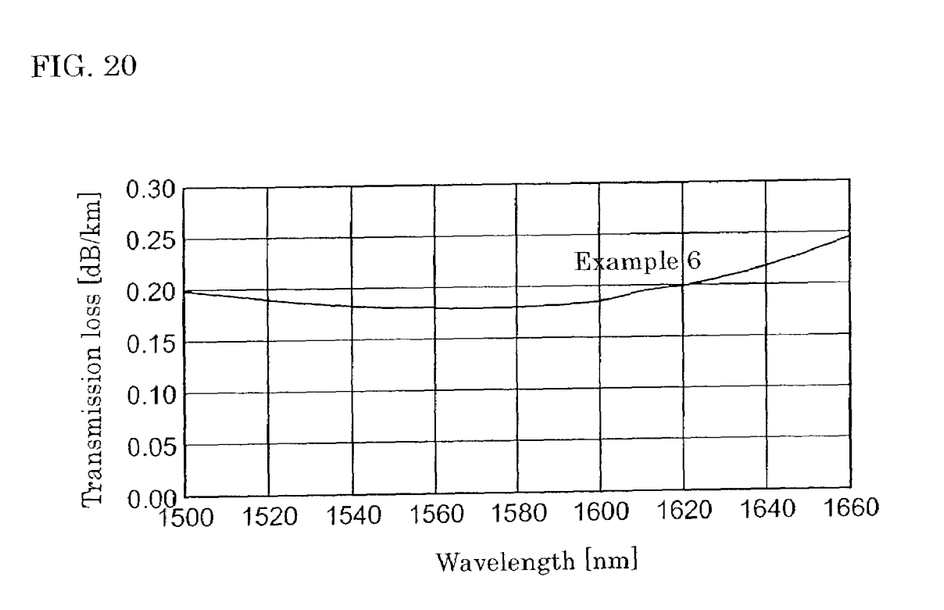
FIG. 20 is a graph showing the relationship between the transmission loss and the wavelength for the optical fiber of Example 6.
Figure 21:
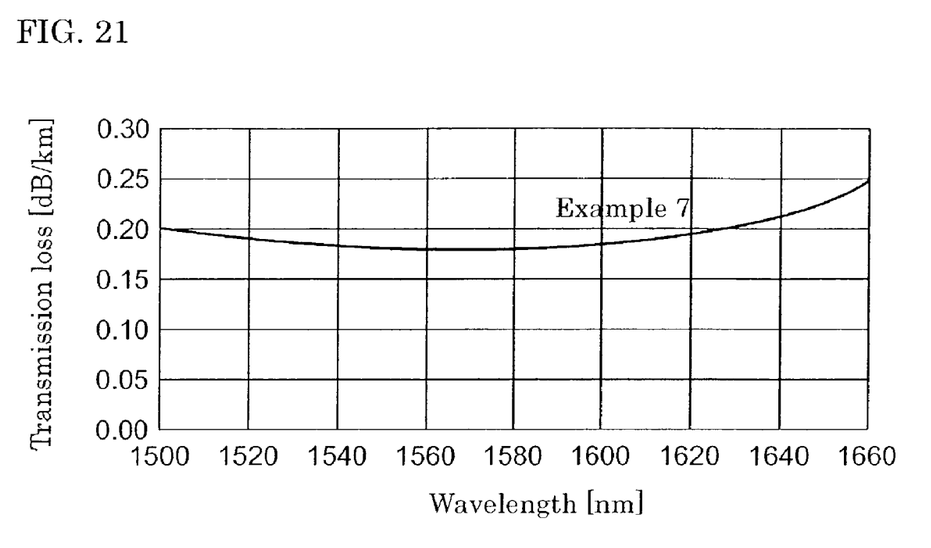
FIG. 21 is a graph showing the relationship between the transmission loss and the wavelength for the optical fiber of Example 7.

As shown in FIG. 18, the optical fiber of Example 4 had a transmission loss of 0.187 dB/km at a wavelength of 1,530 nm, 0.180 dB/km at a wavelength of 1,550 nm, and 0.181 dB/km at a wavelength of 1,570 nm. As shown in FIG. 19, the optical fiber of Example 5 had a transmission loss of 0.184 dB/km at a wavelength of 1,530 nm, 0.180 dB/km at a wavelength of 1,550 nm, and 0.178 dB/km at a wavelength of 1,570 nm. As shown in FIG. 20, the optical fiber of Example 6 had a transmission loss of 0.185 dB/km at a wavelength of 1,530 nm, 0.180 dB/km at a wavelength of 1,550 nm, and 0.178 dB/km at a wavelength of 1,570 nm. As shown in FIG. 21, the optical fiber of Example 7 had a transmission loss of 0.189 dB/km at a wavelength of 1,530 nm, 0.184 dB/km at a wavelength of 1,550 nm, and 0.183 dB/km at a wavelength of 1,570 nm.

The optical fibers of Examples 4 to 7 had a chromatic dispersion of at least 4 ps/nm/km and at most 15 ps/nm/km at a wavelength of 1,550 nm, a transmission loss of at most 0.190 dB/km at a wavelength of 1,530 to 1,570 nm, and a transmission loss of at most 0.185 dB/km at a wavelength of 1,550 nm. The optical fibers of Examples 4 to 7 had a relative refractive-index difference $\Delta n_1$ of 0.40%, which is slightly different from that (0.43%) used for obtaining the calculation results shown in FIGS. 12 to 17. Consequently, they had properties slightly different from those shown in FIGS. 12 to 17 for the same inner-core diameter.

As can be seen from a comparison of properties between the two types of optical fibers of the first and second embodiments, the optical fiber of the second embodiment has a long effective cutoff wavelength. Consequently, it has a high light-confining effect and a small bending loss. Therefore, it is suitable for use in optical transmission lines.

Figure 22:
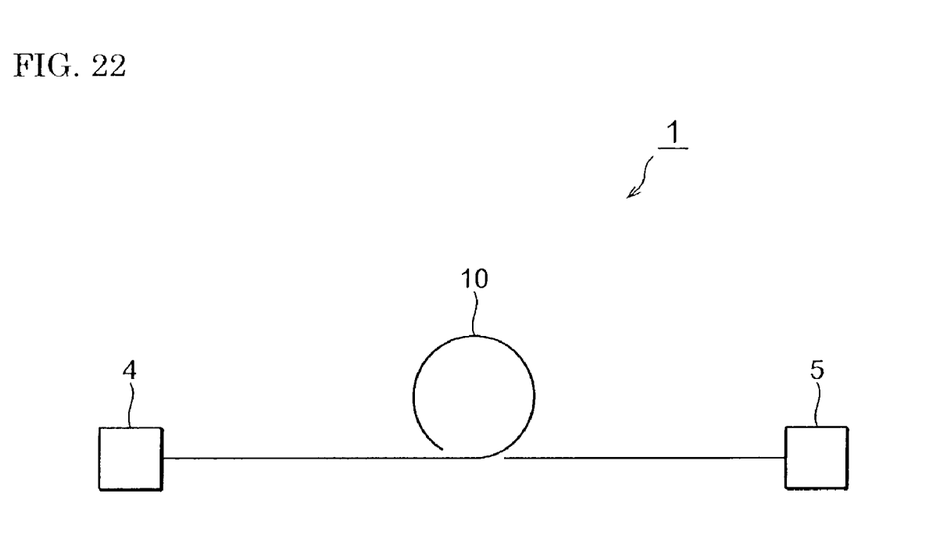
FIG. 22 is a constitutional diagram showing an optical communications system 1 of a first system embodiment.
Figure 23:
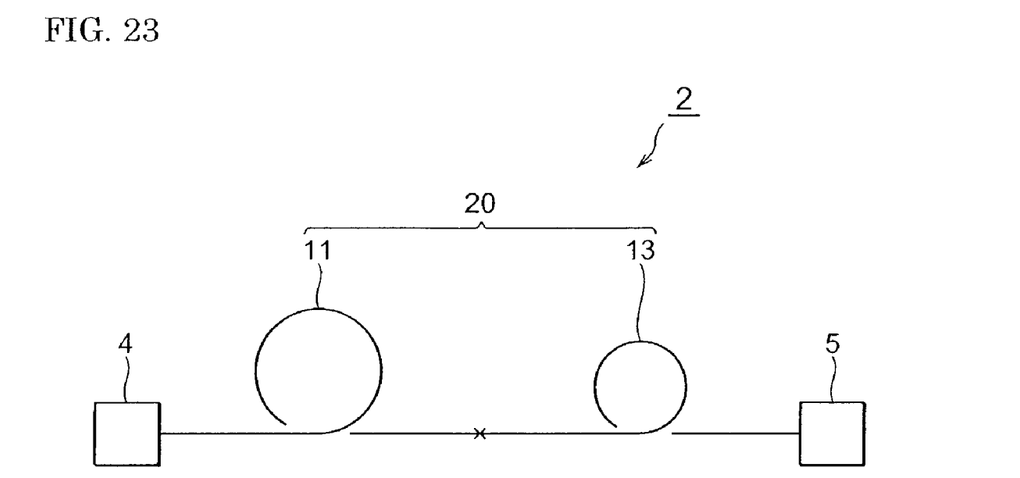
FIG. 23 is a constitutional diagram showing an optical communications system 2 of a second system embodiment.
Figure 24:
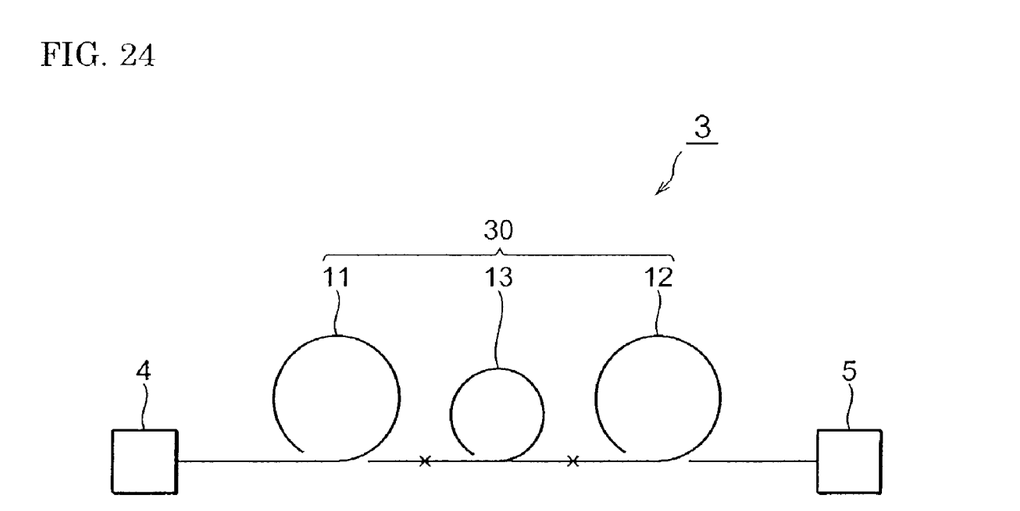
FIG. 24 is a constitutional diagram showing an optical communications system 3 of a third system embodiment.

Next, embodiments of an optical transmission line and an optical communications system of the present invention are explained below. FIG. 22 is a constitutional diagram showing an optical communications system 1 of a first system embodiment. FIG. 23 is a constitutional diagram showing an optical communications system 2 of a second system embodiment. FIG. 24 is a constitutional diagram showing an optical communications system 3 of a third system embodiment.

The optical communications system 1 comprises an optical repeater (or an optical transmitter) 4, another optical repeater (or an optical receiver) 5, and an optical transmission line 10 installed between the two repeaters. The optical transmission line 10 is composed of the optical fiber of the present invention.

The optical communications system 2 comprises an optical repeater 4, another optical repeater 5, and an optical transmission line 20 installed between the two repeaters. The optical transmission line 20 is composed of a first optical fiber 11 and a dispersion-compensating optical fiber 13. The two types of optical fibers are connected by fusion splicing. The first optical fiber 11 is the optical fiber of the present invention. The dispersion-compensating optical fiber 13 has a chromatic dispersion with a sign opposite to that of the chromatic dispersion of the first optical fiber 11 and a dispersion slope with a sign opposite to that of the dispersion slope of the first optical fiber 11 to compensate the chromatic dispersion and dispersion slope of the first optical fiber 11. In the optical communications system 2, signal-carrying light waves transmitted by the optical repeater 4 initially propagate over the first optical fiber 11 and then propagate over the dispersion-compensating optical fiber 13 to arrive at the optical repeater 5.

The optical communications system 3 comprises an optical repeater 4, another optical repeater 5, and an optical transmission line 30 installed between the two repeaters. The optical transmission line 30 is composed of a first optical fiber 11, a dispersion-compensating optical fiber 13, and a second optical fiber 12. The three lengths of optical fibers are connected by fusion splicing in this order. Each of the first and second optical fibers 11 and 12 is the optical fiber of the present invention. The dispersion-compensating optical fiber 13 has a chromatic dispersion with a sign opposite to that of the chromatic dispersion of the first and second optical fibers 11 and 12 and a dispersion slope with a sign opposite to that of the dispersion slope of the first and second optical fibers 11 and 12 to compensate the chromatic dispersion and dispersion slope of the first and second optical fibers 11 and 12.

In the optical communications system 3, signal-carrying light waves transmitted by the optical repeater 4 initially propagate over the first optical fiber 11, next propagate over the dispersion-compensating optical fiber 13, and then propagate over the second optical fiber 12 to arrive at the optical repeater 5. Conversely, signal-carrying light waves transmitted by the optical repeater 5 initially propagate over the second optical fiber 12, next propagate over the dispersion-compensating optical fiber 13, and then propagate over the first optical fiber 11 to arrive at the optical repeater 4.

Figure 25:
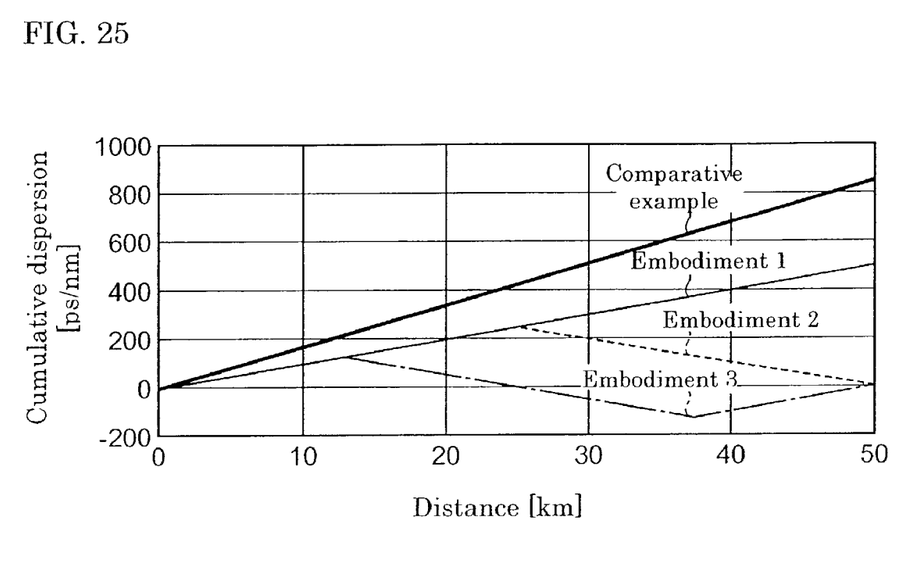
FIG. 25 is a diagram showing the distribution of the cumulative dispersion in the optical communications systems 1 to 3 of the first to third system embodiments.

FIG. 25 is a diagram showing the distribution of the cumulative dispersion in the optical communications systems 1 to 3 of the first to third system embodiments. In FIG. 25, the terms "Embodiment 1," "Embodiment 2," and "Embodiment 3" represent "the optical communications system 1 of the first system embodiment," "the optical communications system 2 of the second system embodiment," and "the optical communications system 3 of the third system embodiment," respectively. In FIG. 25, the optical transmission lines 10 to 30 each have a length of 50 km. The optical fiber constituting the optical transmission line 10, the first optical fiber 11, and the second optical fiber 12 each have a chromatic dispersion of 10 ps/nm/km at a wavelength of 1,550 nm. The dispersion-compensating optical fiber 13 has a chromatic dispersion of −10 ps/nm/km at a wavelength of 1,550 nm. In the optical transmission lines 20 and 30, the length of each optical fiber is determined to cause the total cumulative dispersion to become zero. In the optical transmission line 30 of the third system embodiment, the first and second optical fibers 11 and 12 have the same length. In FIG. 25, the cumulative dispersion shows the cumulative amount of chromatic dispersion from the point of the optical repeater 4, at which signal-carrying light waves enter the optical transmission line, to a point on the optical transmission line. FIG. 25 also includes Comparative example for which an optical transmission line is composed solely of a typical single-mode optical fiber having a chromatic dispersion of 17 ps/nm/km at a wavelength of 1,550 nm.

As shown in FIG. 25, the optical transmission line 10 constituting part of the optical communications system 1 of the first system embodiment has $^{10}/_{17}$ the cumulative dispersion of the optical transmission line of Comparative example and therefore is suitable for suppressing the degradation of the wave form of the signal-carrying light waves due to the cumulative dispersion. The optical transmission line 20 constituting part of the optical communications system 2 of the second system embodiment has one-half the maximum value of the cumulative dispersion of the optical transmission line 10 and therefore is more suitable for suppressing the degradation of the wave form of the signal-carrying light waves due to the cumulative dispersion (the optical transmission line 20 comprises the optical fiber of the present invention and a dispersion-compensating optical fiber). The optical transmission line 30 constituting part of the optical communications system 3 of the third system embodiment has a further reduced maximum value of the cumulative dispersion and therefore is yet more suitable for suppressing the degradation of the wave form of the signal-carrying light waves due to the cumulative dispersion (the optical transmission line 30 comprises two lengths of the optical fiber of the present invention and a dispersion-compensating optical fiber placed in between).

The optical transmission line constituting part of the optical communications system of each of the first to third system embodiments incorporates the optical fiber of the present invention having a chromatic dispersion of at least 4 ps/nm/km at a wavelength of 1,550 nm and therefore can suppress the degradation of the wave form of the signal-carrying light waves due to four-wave mixing. Because the optical fiber of the present invention used in the foregoing optical transmission line has a transmission loss of at most 0.190 dB/km at a wavelength of 1,530 to 1,570 nm, the optical transmission line constituting part of the optical communications system of each of the first to third system embodiments can transmit high-bit-rate signal-carrying light waves over long distances with low loss and high quality.

The entire disclosure of the Japanese Patent Application No. 2001-272418 filed on Sep. 7, 2001 including the specification, claims, drawings, and summary is incorporated herein by reference in its entirety.

What is claimed is:

1. An optical transmission line comprising:
   (a) a first optical fiber having:
      (a1) a chromatic dispersion of at least 4 ps/nm/km and at most 15 ps/nm/km at a wavelength of 1,550 nm; and
      (a2) a transmission loss of at most 0.190 dB/km at a wavelength of 1,530 to 1,570 nm; and
      (a3) an effective cutoff wavelength measured by the 2-meter method of 1610 nm or more; and
   (b) a dispersion-compensating optical fiber that:
      (b1) is connected to the first optical fiber,
      the optical transmission line further comprising a second optical fiber that:
   (a) is connected to the free end of the dispersion-compensating optical fiber;
   (b) has a chromatic dispersion of at least 4 ps/nm/km and at most 15 ps/nm/km at a wavelength of 1,550 nm; and
   (c) has a transmission loss of at most 0.190 dB/km at a wavelength of 1,530 to 1,570 nm;
   the dispersion-compensating optical fiber compensating the chromatic dispersion and dispersion slope of the first and second optical fibers.

2. An optical communications system comprising:
   (a) a repeater;
   (b) a first optical fiber that:
      (b1) is connected to the repeater;
      (b2) has a chromatic dispersion of at least 4 ps/nm/km and at most 15 ps/nm/km at a wavelength of 1.550 nm; and
      (b3) has a transmission loss of at most 0.190 dB/km at a wavelength of 1,530 to 1.570 nm; and
      (b4) has an effective cutoff wavelength measured by the 2-meter method of 1610 nm or more;
   (c) a dispersion-compensating optical fiber that:
      (c1) is connected to the free end of the first optical fiber; and
   (d) another repeater connected to the free end of the dispersion-compensating optical fiber, the optical communications system further comprising a second optical fiber that:
   (a) is inserted between the dispersion-compensating optical fiber and the other repeater;
   (b) has a chromatic dispersion of at least 4 ps/nm/km and at most 15 ps/nm/km at a wavelength of 1,550 nm; and
   (c) has a transmission loss of at most 0.190 dB/km at a wavelength of 1,530 to 1,570 nm;
   the dispersion-compensating optical fiber compensating the chromatic dispersion and dispersion slope of the first and second optical fibers.

* * * * *